United States Patent
Dirschl et al.

(10) Patent No.: US 6,387,999 B1
(45) Date of Patent: May 14, 2002

(54) COMPOSITIONS FOR THE OIL AND WATER REPELLENT FINISHING OF FIBER MATERIALS

(75) Inventors: Franz Dirschl, Augsburg; Simpert Lüdemann, Bobingen; Edeltraud Schidek, Augsburg; Heinz Gaugenrieder, Zusmarshausen; Wilhelm Artner, Motzenhofen, all of (DE)

(73) Assignee: Ciba Specialty Chemicals Corporation, Tarrytown, NY (US)

(*) Notice: Subject to any disclaimer, the term of this patent is extended or adjusted under 35 U.S.C. 154(b) by 0 days.

(21) Appl. No.: 09/669,466

(22) Filed: Sep. 25, 2000

(30) Foreign Application Priority Data

Sep. 30, 1999 (EP) .............................. 99119417
Jun. 6, 2000 (DE) ........................ 100 28 050

(51) Int. Cl.$^7$ ................................ C08L 51/00
(52) U.S. Cl. ................................... 524/537; 524/507
(58) Field of Search ................................ 524/537, 507

(56) References Cited

U.S. PATENT DOCUMENTS

| | | | |
|---|---|---|---|
| 3,491,169 A | 1/1970 | Reynolds et al. | 260/900 |
| 3,808,251 A | 4/1974 | Rondestvedt, Jr. | 260/455 |
| 3,893,984 A | 7/1975 | Hager et al. | 260/79.7 |
| 3,923,715 A | 12/1975 | Dettre et al. | 260/29.6 |
| 4,264,484 A | 4/1981 | Patel | 260/29.6 |
| 4,401,780 A | 8/1983 | Steel | 524/225 |
| 4,742,140 A | 5/1988 | Greenwood et al. | 526/245 |
| 4,834,764 A | 5/1989 | Denier et al. | 8/115.64 |
| 4,898,981 A | 2/1990 | Falk et al. | 568/28 |
| 4,946,992 A | 8/1990 | Falk et al. | 560/227 |
| 5,019,428 A | 5/1991 | Lüdemann et al. | 427/387 |
| 5,045,624 A | 9/1991 | Falk et al. | 528/70 |
| 5,214,121 A | 5/1993 | Mosch et al. | 528/49 |
| 5,491,261 A | 2/1996 | Haniff et al. | 562/582 |
| 5,508,370 A | 4/1996 | Reiff et al. | 528/45 |
| 5,525,732 A | 6/1996 | Haniff et al. | 546/248 |
| 5,663,273 A | 9/1997 | Haniff et al. | 528/70 |
| 5,693,737 A | 12/1997 | Reiff et al. | 528/45 |
| 5,693,747 A | 12/1997 | Deisenroth et al. | 528/401 |
| 5,725,789 A | 3/1998 | Huber et al. | 252/8.62 |
| 6,080,830 A | 6/2000 | Dirschl et al. | 528/45 |
| 6,284,853 B1 * | 9/2001 | Yamana | 526/245 |

FOREIGN PATENT DOCUMENTS

| | | |
|---|---|---|
| DE | 4113891 | 10/1992 |
| EP | 0113217 | 7/1984 |
| EP | 0208421 | 1/1987 |
| EP | 0234724 | 9/1987 |
| EP | 0190993 | 11/1989 |
| WO | 95/33093 | 12/1995 |
| WO | 99/14422 | 3/1999 |

OTHER PUBLICATIONS

Chem. Abstr. 118:192988 for DE 4113891 (1992).

* cited by examiner

*Primary Examiner*—Paul R. Michl
(74) *Attorney, Agent, or Firm*—Kevin T. Mansfield

(57) ABSTRACT

Compositions comprising an ester with perfluoroalkyl groups and an oligo- or polyurethane which may likewise contain perfluoroalkyl groups are useful for the oil and water repellant finishing of sheetlike textile materials. The compositions may additionally include acrylic polymers having perfluoroalkyl groups and extenders. Especially the use of nonionic aqueous dispersions of the compositions makes it possible to obtain textiles with little if any effect losses after mechanical abrasion and good LAD effects.

18 Claims, No Drawings

COMPOSITIONS FOR THE OIL AND WATER REPELLENT FINISHING OF FIBER MATERIALS

This invention relates to a composition comprising a fluorine-containing ester and an oligourethane or a polyurethane. It further relates to a particularly advantageous process for preparing aqueous dispersions of such compositions and to the use of such compositions for treating fiber materials.

It is known to confer an oil and water repellent finish on fiber materials, especially functional textiles in the form of sheet material, by applying fluoropolymers to them. This frequently takes the form of applying polymers that contain perfluorinated radicals ($R_F$) to the textiles in the form of aqueous dispersions. Useful polymers here include such acrylate homo- or copolymers, polyurethanes and polyesters as contain $R_F$ radicals.

The use of $R_F$-containing acrylates for the treatment of textiles is described for example in U.S. Pat. Nos. 4,742,140, 5,725,789 and 3,491,169. The use of $R_F$-containing polyurethanes is disclosed in U.S. Pat. Nos. 5,019,428, 3,923,715 discloses the use of mixtures of an $R_F$-containing ester and a nonfluorinated vinyl polymer. EP-A 208 421 likewise describes mixtures for the oil and water repellent finishing of textiles. WO 95/33093 relates to the finishing of textiles with fluorinated compounds and extenders. Finally U.S. Pat. Nos. 4,264,484 and 4,401,780 likewise disclose mixtures which contain fluorinated fractions and are useful for the treatment of textile sheet materials.

Prior art compositions do not have optimal properties with regard to the oil and water repellent finishing of textile materials. First, the stability of aqueous dispersions of a number of such compositions is unsatisfactory. This is a disadvantage because the use of compositions for textile treatment in the form of aqueous dispersions is the technically and economically best method. Secondly, the desired performance level is in a number of cases achievable only, if at all, with high product add-ons on the textile. Thirdly, it is a frequently observed disadvantage that the performance of finished textiles deteriorates excessively on abrasion because, in use, ie. under mechanical stress, a certain proportion of the finishing products on the surface of the textile is removed by abrasion, and this has an adverse effect on the permanence of the finishing effects.

It is an object of the present invention to provide a composition for conferring a highly effective oil and water repellent finish on fiber materials that is obtainable in the form of very stable aqueous dispersions and that provides finished fiber materials with minimal if any post-abrasion deterioration in performance.

This object is achieved by a composition comprising a component A and a component B, component A being an ester or a mixture of esters and being obtainable by reacting a dicarboxylic acid or a mixture of dicarboxylic acids of the formula (I)

$$\text{HOOC-(CH R)}_a\text{-COOH} \tag{I}$$

with a diol or a mixture of diols selected from diols of the formulae (II) to (XI)

  (II)

HO—CH$_2$—CRR'-(X)$_d$-CRR'—CH$_2$OH   (III)

  (IV)

HO—CH$_2$CH$_2$—N R"—CH$_2$CH$_2$OH   (V)

  (VI)

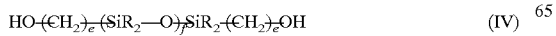  (VII)

  (VIII)

[$R_{F2}$—CH=CH—CH$_2$—Y—CH$_2$—C(R$_2$)(Z)—CH$_2$—]$_2$X$^1$   (IX)

[$R_{F2}$—CH=CH—CH$_2$—X$^1$—CH$_2$—]$_2$C(CH$_2$OH)$_2$   (X)

   (XI)

subject to the proviso that at least one diol of the formula (II) or of the formula (III) or of one of the formulae (VII) to (XI) participate in the reaction, and component B being an oligourethane or polyurethane obtainable by reacting a diol or a mixture of diols selected from diols of the formulae (II) to (XII)

$$(\text{HO—CH}_2)_3\text{C—H}_2\text{—CH}_3 \tag{XII}$$

with a diisocyanate or a mixture of diisocyanates of the formula (XIII)

$$\text{OCN—R'''—NCO} \tag{XIII}$$

where any R is independently of the others hydrogen or an alkyl radical of 1 to 4 carbon atoms, a is from 2 to 10, preferably from 2 to 6, b is from 1 to 4, c is 0 or 1, d is 0 or 1, $R_{F1}$ is $CF_3\text{-(CF}_2)_{h1}$, h1 is from 3 to 15, preferably from 7 to 11, R' is —(CH$_2$)$_b$— when d is 1 and —X—(CH$_2$)$_b$— when d is 0, e is from 1 to 4, f is from 10 to 50, g is from 0 to 6, t is from 0 to 8, X is —O—, —S—, —NR— or —PR—, preferably —S—, R" is R or —CH$_2$CH$_2$OH, X$^1$ is —O—, —S—, —NR$^2$—, —PR$^2$—, —S—(CH$_2$)$_{b1}$S—, —(S)$_u$—, —S(O$_2$)— or —S(O$_2$)—(CH$_2$)$_{b1}$S(O$_2$)— preferably —S—, Y is —O—, —S—, —NR$^2$— or —PR$^2$—, preferably —O—, Z is —(CH$_2$)$_{c1}$—(OC$_p$H$_{2p}$)$_{e1}$—(OCHR—CHR)$_{d1}$OH, b1 is from 1 to 4, preferably 1, c1 is from 0 to 18, d1 is from 0 to 8, $R_{F2}$ is $CF_3\text{-(CF}_2)_{h2}$, h2 is from 3 to 19, preferably from 7 to 11, e1 is from 0 to 8, any R$^2$ is independently of the others hydrogen or a branched or unbranched alkyl radical of 1 to 18, preferably 2 to 6 or 16 to 18, carbon atoms, p is from 3 to 8, u is from 2 to 8, R''' is a divalent aliphatic or cycloaliphatic radical of 4 to 40 carbon atoms or is a divalent aromatic radical of the formula —C$_6$H$_3$(R)— or —C$_6$H$_3$(R)—CH$_2$—C$_6$H$_3$(R)— or —C$_6$H$_3$(R)—CR$_2$—C$_6$H$_3$(R)—, where $C_6H_3$ is a trivalent radical derived from benzene, and if desired blocking any isocyanate groups left in the reaction product of diol and diisocyanate.

Compositions according to the invention are very useful for the treatment of fiber materials, especially textile sheet materials such as upholstery fabrics. The fiber materials here are preferably textile sheet materials which are 50 to 100% by weight synthetic polymer, especially polyester, polyacrylonitrile or polyamide or mixtures thereof, and 0 to 50% by weight native fiber, especially cellulose. The sheet materials acquire oil and water repellent properties as a result. A particular advantage of the use of compositions according to the invention is that the finished fiber materials suffer little if any loss of oil and water repellent performance on mechanical abrasion. Treatment with compositions according to the invention also makes it possible to confer a pleasantly soft hand and substantial resistance to yellowing on fiber materials.

Compositions according to the invention are preferably used in the form of aqueous dispersions. A preferred embodiment thus includes water and one or more dispersants as well as the components A and B. They preferably include at least one nonionic dispersant or a mixture of nonionic dispersants. In individual cases it is also possible for them to additionally include an anionic, cationic or amphoteric dispersant. In some cases, useful aqueous dispersions are obtainable by using a mixture of a nonionic dispersant and a cationic dispersant.

Compositions according to the invention include at least a component A and a component B.

Component A is an ester or a mixture of esters obtainable by reacting a dicarboxylic acid or a mixture of dicarboxylic acids of the formula (I)

  (I)

with a diol or a mixture of diols selected from diols of the formulae (II) to (XI)

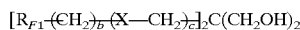  (II)

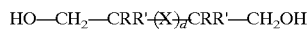  (III)

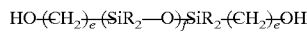  (IV)

  (V)

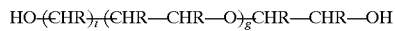  (VI)

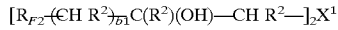  (VII)

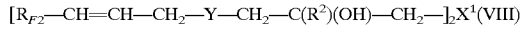  (VIII)

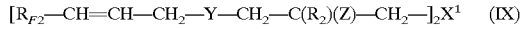  (IX)

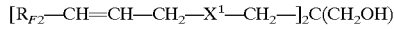  (X)

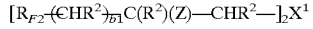  (XI)

It will be appreciated that the use of a mixture of dicarboxylic acids and/or a mixture of diols provides a component A which is not an individual ester, but a mixture of esters. The reaction with the dicarboxylic acid of the formula I shall involve at least one diol of the formula (II) or (III) or of one of the formulae (VII) to (XI). Diols of the formulae (IV), (V) and/or (VI) may be additionally involved in the reaction.

Diols for the purposes of the invention (component A, component B) are compounds conforming to one of the formulae (II) to (XII). Compounds which fall within one of these formulae are diols for the purposes of the invention, even if they contain more than two alcoholic hydroxyl groups, ie. are strictly speaking not diols. Examples of such "diols" are triethanolamine (formula (V) with R"=—$CH_2CH_2OH$) and 1,1,1-trimethylolpropane (formula (XII)).

Dicarboxylic acids useful for preparing component A fall within the abovementioned formula (I). Here, a is from 2 to 10, preferably from 2 to 6. R is hydrogen or an alkyl radical of 1 to 4 carbon atoms. Particularly good results are obtainable on using adipic acid (R=H, a=4) as dicarboxylic acid.

The diols or diol mixtures useful as starting compounds for preparing the esters (component A) conform to one or more of the formulae (II) to (XI). At least one diol of the formula (II) or (III) or of one of the formulae (VII) to (XI) shall be used. As a consequence, component A will be at least in part made up of one or more esters containing perfluorinated radicals $R_F$. Preferred diols of the formula (II) are diols in which X is —S—, b=2, c=1 and $R_{F1}$ is an unbranched perfluoroalkyl radical of 8 to 12 carbon atoms. The preparation of some preferred diols is described in EP-A 348 350. Particularly useful as component A are esters that are obtainable from adipic acid and the abovementioned preferred diols of the formula (II), especially diols of the formula (II) where b=2, c=1, X=—S— and $R_{F1}$=$CF_3$—$(CF_2)_{h1}$, where h1 is from 7 to 11 for the individual diols of the mixture. Preferred diols of the formulae (VII) to (XI) are diols in which $X^1$ is —S—, Y is —O—, Z is —$(CH_2)_{c1}$—$(OCH_2CH_2)_{d1}OH$, b1 is 1 or 2, c1 is from 0 to 8, $R_{F2}$ is an unbranched perfluoroalkyl radical of 8 to 12 carbon atoms and d1 is from 0 to 6. Particularly useful as component A are esters obtainable from adipic acid and one or more of the abovementioned preferred diols of the formula (II) or of one of the formulae (VII) and (VIII) or a mixture of diols of the formulae (VII) and (VIII), especially those diols of the formula (VII) or (VI) where b=1, $X^1$=—S— or —$NR^2$—, Y=—O— and $R_{F2}$=$CF_3$—$(CF_2)_{h2}$, where h2 is from 7 to 11 for the individual diols of the mixture.

Also very useful are esters prepared by reacting adipic acid with a mixture of diols of the formula (II) and of the formula (IV), (V) and/or (VI) or with a mixture of diols of the formula (VII) and of the formula (VIII), (IX), (X) and/or (XI). These esters and other esters useful as component A may be prepared according to generally known chemical methods, for example by esterifying or condensing the dicarboxylic acid with diol or by transesterifying with diol under acid catalysis in the presence or absence of an organic solvent. Ketones are useful solvents.

Of the diols of the formula (III), particularly useful ones have R equal H, X equal —S— and d=1. In this case, R' is —$(CH_2)_b R_{F1}$, where b is from 1 to 4, preferably 1, and $R_{F1}$ is a perfluorinated linear alkyl radical of 4 to 16, preferably 8 to 12, carbon atoms. Also very useful are diols of the formula (III) where d=0. In this case, R' is —X—$(CH_2)_b R_{F1}$. X is again preferably —S— and b and $R_{F1}$ are each as defined above, although b in this case is preferably 2. Of the diols of the formula (IV), preferred ones have e from 1 to 3 and all R radicals equal $CH_3$. Diols of the formula (IV) where R=H are less preferred; more particularly, in the —$SiR_2$— units of the formula IV the two R radicals are never both hydrogen.

Of the diols of the formula (V), diethanolamine, triethanolamine and N-methyldiethanolamine are particularly useful.

Of the diols of the formula (VI), particularly useful ones have all R radicals in the —$(CHR)_f$— units equal hydrogen. In the —$(CHR—CHR—O)_g$— units, preferably all R radicals are independently hydrogen or $CH_3$.

Of the diols of the formula (VIII), particularly useful ones have Y equal —O—, $X^1$ equal —S— or —$NR^2$— and $R_{F2}$ equal a perfluorinated linear alkyl radical of 4 to 16, preferably 8 to 12, carbon atoms.

Of the diols of the formulae (IX), (X) and (XI), preferred ones have $X^1$ equal —S— or —$NR^2$—, b1 equal 1, Z equal —$(CH_2)_{c1}$—$(OCH_2CH_2)_{d1}$OH, c1 from 0 to 8 and d1 from 0 to 6.

In the abovementioned formulae (VII) to (XI), $X^1$ is —O—, —S—, —$NR^2$—, —$PR^2$—, —(S)$_a$—, —S—$(CH_2)_{b1}$S—, —S($O_2$)— or —S($O_2$)—$(CH_2)_{b1}$S($O_2$)— preferably $X^1$ is —S— or —$NR^2$—. An —S($O_2$)— grouping is a sulfone group that is obtainable by oxidation of the corresponding sulfide group.

Diols of the formula (VII) where $X^1$ is —S— or —(S)$_a$— are obtainable according to the following general method:

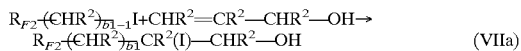

The compound (VIIa) is reacted with $Na_2S$ or Na—(S)$_a$—Na, eliminating HI from (VIIa) to form an epoxide intermediate. Two such epoxide molecules react with $S^{2-}$ or —(S)$_a^{2-}$ by ring opening to form the diol of the formula (VII).

For Z=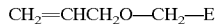—(O CHR—CHR)$_{a1}$OH, diols of the formula (XI) are preparable from the diols of the formula (VII) by alkoxylation, eg. ethoxylation, or by corresponding etherification reactions.

Diols of the formula (X) are preparable by reacting $R_{F2}$—I with ($CH_2$=CH—$CH_2$—$X^1$—$CH_2$)$_2$C($CH_2$OH)$_2$, to form ($R_{F2}$—$CH_2$—CH(I)—$CH_2$—$X^1$—$CH_2$)$_2$C($CH_2$OH)$_2$. Reaction with sodium hydroxide produces from this (by HI elimination) ($R_{F2}$—CH=CH—$CH_2$—$X^1$—$CH_2$)$_2$C($CH_2$OH)$_2$. $X^1$ here is preferably —O— or —S—.

Diols of the formula (VIII) where $X^1$ is $NR^2$ or $PR^2$ and Y is —O— are preparable by reacting allyl glycidyl ethers $CH_2$=CHCH$_2$O—$CH_2$—E where E is a monovalent radical derived from ethylene oxide (or from $R^2$-substituted ethylene oxide), with $H_2NR^2$ or $H_2PR^2$ to form compounds of the formula

[$CH_2$=CH—$CH_2$O—$CH_2$—$CR^2$(OH)—$CH_2$—]$_2$$NR^2$—
(or $PR^2$ instead of $NR^2$).

These compounds are reacted with $R_{F2}$-I, with the $R_{F2}$-I adding to the C=C double bond. HI is subsequently eliminated in an alkaline medium to form a compound of the formula (VIII). Diols of the formula (VIII) can be used to obtain diols of the formula (IX) by alkoxylation, eg. ethoxylation or etherification, as described above for the preparation of diols of the formula (XI).

A number of methods of preparing useful diols are disclosed in U.S. Pat No. 5,693,747.

The esters which form component A are compounds or mixtures of compounds which preferably contain 1 to 10 units derived from the dicarboxylic acid or units derived from the diol. Owing to the presence of the $R_F$ radicals, which contain a plurality of $CF_2$ groups, component A is an oligomer or polymer or a mixture of oligomers or polymers. Depending on the number of ester groupings, which is preferably 1 to 10, as mentioned above, component A may additionally constitute an oligoester or polyester or a mixture of oligoesters or polyesters. The number of units derived from the dicarboxylic acid and the diol, ie. the number of ester linkages, which is preferably 1 to 10, can be controlled through the reaction conditions for the reaction of dicarboxylic acid (derivative) with diol. For instance, an esterification or transesterification reaction can be discontinued in a conventional manner, by lowering the temperature or changing the pH (removing the acid used as catalyst).

By contrast, component B, as more particularly described hereinbelow, is an oligourethane or polyurethane if only because a plurality of urethane linkages are present. That is, component B acquires the character of an oligomer or polymer or of a mixture of oligomers and polymers not solely by virtue of $R_F$ radicals.

Component A preferably comprises esters obtainable by reacting (polycondensing) dicarboxylic acid or dicarboxylic acid mixture with diol or diol mixture in such a ratio that a total of 0.9 to 1.1 mol of alcoholic OH groups in the diol or diol mixture are used per mole of —COOH groups in the dicarboxylic acid or dicarboxylic acid mixture and 50 to 100% of the number of these alcoholic OH groups come from a diol of the formula (II) and/or of the formula (III) and/or of one of the formulae (VII) to (XI). When component A is prepared by transesterification, it is similarly preferable to use 0.9 to 1.1 mol of alcoholic groups per ester group of the dicarboxylic diester used as starting material.

Component B in the compositions of the invention is an oligo- or polyurethane obtainable by reacting a diol or diol mixture selected from diols of the formulae (II) to (XII) with a diisocyanate or diisocyanate mixture. Formula (XII) describes 1,1,1-trismethylolpropane. What was said above with regard to particularly suitable, preferred compounds of these formulae for the preparation of component A applies to the preparation of component B as well. In contradistinction to the preparation of component A, however, it is not absolutely necessary for the preparation of component B that at least one diol of the formula (II) or of the formula (III) or of one of the formulae (VII) to (XI) participate in the reaction. Preferably, however, component B is prepared using at least one diol of the formula (II), (III), (VII), (VIII), (IX), (X) or (XI) alone or as part of a diol mixture.

The diisocyanate or mixture of diisocyanates which can be reacted with diol or diol mixture to form a component B conforms to the formula (XIII).

$$OCN—R'''—NCO \qquad (XIII).$$

where R''' is a divalent aliphatic or cycloaliphatic radical of 4 to 40 carbon atoms or is a divalent aromatic radical of the formula —$C_6H_3$(R)— or of the formula —$C_6H_3$(R)—$CR_2$—$C_6H_3$(R)— or of the formula —$C_6H_3$(R)—$CH_2$—$C6H_3$(R)—, where $C_6H_3$ is a trivalent radical derived from benzene. One of these 3 free valences is attached to R, R being as defined above, preferably being hydrogen or methyl. The other two free valences on $C_6H_3$ are preferably disposed para to each other, ie. the isocyanate groups are preferably disposed para to each other.

Aliphatic or cycloaliphatic R''' may be linear or branched. Useful diisocyanates for preparing component B include for example hexamethylene 1,6-diisocyanate, trimethylhexamethylene 1,6-diisocyanate (mixed isomers) or DDI 1410 diisocyanate (from Henkel, USA), DDI 1410 diisocyanate being a cyclohexane derivative where each of 4 ring carbon atoms has a relatively long alkyl radical attached to it. Two of these long-chain alkyl radicals have a terminal —NCO group. DDI 1410 diisocyanate has a total of 38 carbon atoms. Preference is given to using diisocyanates of the formula (XIII) where R''' is an open-chain aliphatic, branched or unbranched radical of 4 to 10 carbon atoms, a cycloaliphatic radical of 6–40 carbon atoms or an aromatic radical of the abovementioned structure. Preferred cycloaliphatic diisocyanates include unsubstituted cyclohexane 1,4-diisocyanate, alkyl- mono- or -polysubstituted cyclohexane 1,4-diisocyanate and a cyclohexane which is substituted by alkyl groups whereof two are terminated by —NCO groups.

Particularly preferred aromatic diisocyanates are toluylene diisocyanates $C_6H_3(CH_3)(NCO)_2$, where $C_6H_3$ is again a trivalent radical derived from benzene. The position of the methyl group and of the two NCO groups relative to each other is freely choosable, and it is even possible to use mixed isomers, for example a mixture of toluene 2,4-diisocyanate and toluene 2,6-diisocyanate. A further diisocyanate preferred for preparing component B is diphenylmethane 4,4'-diisocyanate.

As with the preparation of component A, a preferred way of preparing component B comprises reacting the starting compounds with each other in equimolar or substantially equimolar amounts. Thus, in a preferred embodiment of composition according to the invention, component B is an oligourethane or polyurethane obtainable by reacting a diol or mixture of diols of the abovementioned formulae (II) to (XII) with a diisocyanate or mixture of diisocyanates of the formula (XIII) in such a ratio that 0.9 to 1.1 mol of NCO groups in the diisocyanate or diisocyanate mixture are used per mole of alcoholic group in the diol or diol mixture.

Component B is an oligomer or polymer, not just on account of the presence of $R_F$ radicals (which, in contradistinction to component A, are not mandatory in component B). On the contrary, component B has the character of an oligomer or polymer if only through the presence of a plurality of urethane linkages, —NH—CO—. Their number in component B is on average 5 to 100 per molecule, preferably 5 to 50. The number of urethane linkages in component B can be controlled in a conventional manner, through the conditions under which it is prepared.

If the oligo- or polyurethane obtained by the reaction of diisocyanate with diol still contains free isocyanatb groups, for example owing to the use of a molar excess of diisocyanate, these NCO groups are preferably blocked. This urethane with blocked isocyanate groups is very useful as component B in compositions according to the invention. NCO groups may be blocked using compounds having acidic hydrogen atoms that are known from the technical literature. Examples of useful blocking agents are dimethylpyrazole, diacetyl, caprolactam and substituted or unsubstituted phenols. Particularly preferred blocking agents for compositions according to the invention are ketone oximes, especially butanone oxime, acetone oxime or methyl isobutyl ketone oxime.

To prepare component B from a mixture of diisocyanates and/or a mixture of diols, the reaction may be carried out by using all individual compounds of the mixtures simultaneously. Examples thereof are the reaction of a single diisocyanate with a mixture of diols, of a diisocyanate mixture with a single diol or the reaction of diisocyanate mixture with diol mixture in the simultaneous presence of all individual compounds of the respective mixtures. However, a particularly useful way to prepare a component B is a process in which the individual compounds of such a mixture are used in succession. This may be illustrated with reference to the example of a preferred embodiment of compositions according to the invention. In this preferred embodiment, component B is an oligourethane or polyurethane obtainable by reacting a diol of the formula (II), of the formula (VII) or of the formula (VIII) with a diisocyanate of the formula OCN—R'"—NCO, where R'" is a linear or branched alkylene radical of 6–12 carbon atoms in such amounts that the resulting reaction product has no free —NCO groups but free OH groups, then further reacting with a cycloaliphatic diisocyanate of 10 to 40 carbon atoms in such amounts that the resulting reaction product has free NCO groups, and then reacting with a diol of the formula (V) in such amounts that the resulting reaction product (component B) has no free NCO groups. This embodiment thus utilizes a mixture of diisocyanates and first reacts the diol with a deficiency of diisocyanate and then with an excess of another diisocyanate and subsequently free NCO groups with another diol (formula V). This preferred embodiment is likewise subject to the above statements with regard to the preferred structures for diisocyanates and diols.

The reaction of diisocyanates with diols which leads to a component B can be carried out according to generally known methods for preparing polyurethanes, for example as a reaction in an organic solvent. As with the preparation of component A, useful solvents include ketones which are later easy to remove by distillation, eg. methyl isobutyl ketone. It is advantageous for the solvent to be easily removable because compositions according to the invention are advantageously used in the form of solvent-free aqueous dispersions when used for treating fiber materials.

Oligo- or polyurethanes useful as component B are described in EP-A 348 350, and a particularly useful process for preparing useful oligo- or polyurethanes is revealed in EP-A 459 125. This process may be used in a similar manner to prepare component B in compositions according to the invention.

It has been found that (non-inventive) compositions in the form of aqueous dispersions which include a component A but no component B do provide a certain level of oil and water repellent performance, but the performance is not satisfactory in every respect. The same is true of compositions which include a component B but no component A. One disadvantage with the former is that it is frequently difficult to obtain a stable aqueous dispersion of component A with nonionic dispersants only. Yet aqueous dispersions are very desirable when component A is to be used for the oil and/or water repellent finishing of textile sheet materials. True, it is possible to obtain stable aqueous dispersions of component A with ionic, for example cationic, dispersants. But this frequently results in the disadvantage that the finished textiles have an increased tendency to deteriorate in performance on abrasion. The reason for this is that abrading will also remove finish (mechanically) from the textile surface. The result is that the oil/water repellency can decrease significantly in the use of the textiles. Moreover, cationic dispersions of component A are not optimal with regard to LAD (laundry air dry) effects, especially on synthetic fiber fabrics. Good LAD effects, ie. post-laundry shape stability of textiles without post-laundry ironing, are desirable because the textiles can be air-dried after laundering without any need for ironing. The textiles retain their original shape on air drying when the finish imparts a good LAD effect. However, it has been determined that aqueous dispersions of component A (without a component B) lead to good LAD values when the dispersions include only nonionic dispersants, ie. in particular no cationic dispersants.

However, such dispersants are frequently stable only for a short time, if at all. Aqueous dispersions which include a component B but no component A have the disadvantage that, although they impart good oil and water repellency when component B contains $R_F$ groups, ie. was prepared from a diol of the formula (II), (III) or of one of the formulae (VII) to (XI), they are not optimal with regard to the LAD performance of the finished textiles.

It has now been found that, surprisingly, a combination of components A and B eliminates the disadvantages described.

Such a combination, which constitutes the essence of the present invention, provides for the positive properties of component A and of component B to be preserved and frequently even improved. Compositions according to the invention provide in many cases better results with regard to durability of the effects on abrasion, LAD and oil and water repellency than either of the two components A and B alone.

Compositions according to the invention provide cotton fiber materials with very good LAD and abrasion resistance performance even when they include ionic, for example cationic, dispersants. By contrast, the LAD and abrasion resistance performance of fabrics composed of synthetic fibers and of synthetic/cotton blends is not optimal in all cases when ionic, especially cationic, dispersants are present. For this reason, aqueous dispersions of compositions according to the invention preferably do not include ionic dispersants, but only nonionic dispersants. This is because in this case they are very useful for treating all kinds of fiber materials, not only cotton but also synthetics or fiber blends. Oil and water repellency, LAD performance and abrasion resistance, ie. resistance of the effects to abrasion, are very good from the use of such nonionic compositions. Although an aqueous dispersion which includes component A but no component B will in many cases only be stable when a cationic dispersant is used, it has been determined that, surprisingly, an aqueous dispersion which includes both A and B is obtainable with high stability even from an exclusively nonionic dispersing system. This applies in particular when the dispersing is effected using the preferred process indicated hereinbelow and in claim 12 (conjoint dispersing of A and B).

Useful nonionic dispersants include surface-active compounds known from the technical literature, for example ethoxylated phenols, carboxylic acids, etc. Useful propoxylated or ethoxylated/propoxylated dispersants (block or random copolymers) have likewise been described in the technical literature. Instead of a single dispersant it is also possible to use a mixture of nonionic dispersants. Particularly useful dispersants for compositions according to the invention in the form of aqueous dispersions are ethoxylated alcohols of the formula $R^1$—O—$(CH_2CH_2O)_n$H. Here $R^1$ is a linear or branched alkyl radical of 6 to 22 carbon atoms and n is from 4 to 14.

Aqueous dispersions of compositions according to the invention that include further ingredients, for example those of the kind mentioned hereinbelow, may for this reason benefit from the presence of certain fractions of ionic surface-active compounds, either as dispersants or as liquor stabilizers. An example of this is a composition according to the invention that is prepared by first preparing an aqueous dispersion of components A and B by using nonionic dispersants exclusively and then adding an aqueous dispersion of an acrylate polymer having $R_F$ groups. Such aqueous $R_F$-acrylate dispersions may be commercially available products, which are frequently prepared using cationic dispersants.

Useful liquor stabilizers are amphoteric dispersants such as amine oxides or pyrazoline-betaines. When ionic dispersants are used at all to prepare aqueous dispersions of compositions according to the invention, they should only be added subsequently to a stable nonionic dispersion and not in the course of the production of a dispersion of components A and B.

In compositions according to the invention that, in addition to the preferred nonionic dispersants, also contain cationic dispersants, for example because of a subsequent addition of a ready-prepared cationic RF-acrylate dispersion, the amount of cationic dispersant should be minimized so as not to risk any deterioration in LAD and abrasion resistance. The subsequent addition of an aqueous dispersion of an acrylic polymer which contains $R_F$ groups can be contemplated in particular when component B is an oligo- or polyurethane which contains no fluorinated radicals ($R_F$ groups). In this case, it can be advantageous to add an $R_F$-acrylic polymer dispersion. This raises the level of fluorine in the composition of the invention and hence also the level of oil/water repellency.

Compositions according to the invention that are not in the form of aqueous dispersions may be prepared by simply mixing the components A and B and optionally further components.

Aqueous dispersions of compositions according to the invention may be prepared according to various methods.

One possibility is to prepare separately a first aqueous dispersion which includes component A but not component B and a second aqueous dispersion which includes B but not A, and then to combine these first and second dispersions. Both the first dispersion and the second dispersion may additionally include further components, for example the hereinbelow more particularly described components C or D, 1,2-propylene glycol and/or a soft hand agent and/or a cellulose crosslinker or else further $R_F$-containing esters or urethanes. Preferably, for the reasons mentioned, both the first and the second aqueous dispersion are free of ionic dispersants, particularly cationic dispersants. In the individual case, however, either of the two may contain a minor amount of a liquor stabilizer of the abovementioned kind. However, a liquor stabilizer and/or further components may also be added after the first and second dispersions have been combined. These components, added only subsequently to the ready-produced dispersion including A and B, may again be of the abovementioned kind. It is advantageous in particular, when this process of preparation is used, for the dispersion created by combining two separate dispersions to include a component C. This component C may be added by adding C either to the first or to the second dispersion or, preferably, only to the ready-produced dispersion created on combining. Component C is an acrylic acid or methacrylic acid homopolymer or copolymer which contains one or more perfluorinated radicals $R_{F1}$ or $R_{F2}$ and is more particularly described hereinbelow. It can be added in the form of the pure polymer, but it is preferable to use a ready-produced aqueous dispersion of the $R_F$ acrylic polymer. The reason why it is preferable for a composition according to the invention to additionally include an $R_F$-acrylic polymer when the components A and B are dispersed separately is that it has been determined that aqueous dispersions which include a component A but no component B are not very stable when no ionic dispersants are used. On mixing such a dispersion of component A with a likewise exclusively nonionic dispersion of component B, the composition obtained is likewise not very stable when component B contains perfluorinated radicals $R_F$. However, when a nonionic dispersion of B does not contain perfluorinated radicals $R_F$, then the stability of the resulting dispersion, which contains both A and B, is substantially increased. When using the production process where a dispersion of A is prepared separately from a dispersion of B and these dispersions are then combined, it is accordingly advantageous in some cases for stability reasons for component B to be an $R_F$-free oligo- or polyurethane. Such an $R_F$-free urethane is preparable by reacting a diisocyanate or diisocyanate mixture of the formula (XIII) with a diol or diol mixture of the formulae (IV), (V), (VI) or (XII), but not of the formula (II) or (III) or of the formulae (VII) to (XI). However, in order that such a dispersion, including an $R_F$-free component B, may provide an optimum oil and water repellency performance, it is preferable to raise the fluorine content of the dispersion by adding a component C. Also, the composition thus obtained frequently has improved stability in the form of an aqueous dispersion.

Although the aforementioned process of separately dispersing component A and component B provides compositions of the invention that are of high quality, a preferred process for preparing compositions according to the invention in the form of aqueous dispersions comprises preparing a mixture of the components A and B which optionally additionally includes an organic solvent and/or a component D, dispersing this mixture in water using a nonionic dispersant or dispersant mixture without using an anionic or cationic dispersant and then optionally removing the organic solvent and optionally adding further components.

It has been determined that compositions according to the invention in the form of aqueous dispersions prepared by this process of conjoint dispersing frequently represent an improvement even over compositions obtained by separate dispersing of A and B. This improvement takes the form in particular of an even further reduced tendency for reduced performance on abrasion and a further improved LAD performance. The reason for this difference between separate and conjoint dispersing is not known; the reason could be that a nonionic dispersion of component A, as used in the separate dispersing process, does not have a particularly high stability, whereas a separate nonionic dispersion of component A is never present in the preferred process of conjoint dispersing. It is accordingly possible that conjoint dispersing confers a different character on the disperse phase and that this character has an effect on the performance level of the finished textile. Accordingly, the preferred process for preparing compositions according to the invention is the process mentioned above and in claim 12, and among the compositions according to the invention that are in the form of aqueous dispersions, preference is given to those which are obtainable by this process.

This preferred process of conjoint dispersing is likewise preferably carried out using not ionic, especially not cationic, dispersants, but only nonionic dispersants. The dispersants may be added to the mixture of components A and B prior to dispersing, so that this dispersant-containing mixture is dispersed in pure water. However, it is also possible—and frequently of advantage—to add the dispersant to the water prior to dispersing and to stir a dispersant-free mixture of components A and B into this dispersant-containing water. In place of a single nonionic dispersant, it is also possible to use a mixture of nonionic dispersants. Dispersing may be effected according to known methods by stirring and subsequent homogenization at room temperature or elevated temperature. Both the mixture of components A and B and the water may contain further components, for example those mentioned above for the case of separate dispersing, prior to the dispersing step. It is also possible for the mixture of components A and B to additionally include an organic solvent in which A and B are soluble, for example a low molecular weight aliphatic ketone. Use of an organic solvent can facilitate the handling of the mixture of A and B. Any organic solvent present is preferably removed again, for example by distillation, after the mixture has been dispersed in water. If it is desired for a composition according to the invention, as well as components A and B and dispersants, to include further components, these can be added to the mixture of A and B or to the water not just before the dispersing step. It is also possible to add one or more further components only after the mixture of A and B has been dispersed.

The preferred process of conjoint dispersing is likewise advantageously carried out using nonionic dispersants of the kind already described above, namely ethoxylated alcohols of the formula $R^1-O-(CH_2CH_2O)_n-H$. A single such alcohol may be used, or a mixture of such alcohols. $R^1$, as observed above, is a linear or branched alkyl radical of 6 to 22 carbon atoms and n is from 4 to 40. However, other nonionic dispersants of the abovementioned kind are also very suitable.

Compositions according to the invention include component A and component B advantageously in such amounts that the weight ratio of A to B is in the range from 1:10 to 5:1. Preference is given to a ratio of 1:1 to 5:1. For the preferred process of conjoint dispersing, therefore, the mixture of components A and B to be dispersed preferably includes these two components in the stated ratio. Compositions according to the invention in the form of aqueous dispersions further include preferably 10 to 50%, especially 10–35%, by weight of the sum total of components A and B. This statement relates to the total weight of the dispersion without organic solvent, ie. to the weight of the dispersion after any organic solvent previously present has been removed. The specified range from 10 to 35% constitutes the optimal range with regard to performance and economic factors. An assay of less than 10% by weight for the sum total of components A and B does not in the individual case ensure that the performance of the oil/water repellent finish on the textile is up to the required level. An assay of more than 50% by weight normally does not provide for a relevant increase in performance, but the costs for the compositions increase.

Compositions according to the invention may, as well as components A and B, include further components. Examples of such components are soft hand agents, cellulose crosslinkers and flame retardants of the type customary in the textile finishing industry.

Compositions according to the invention, as well as components A and B, preferably include in addition one or more of the hereinbelow described components C and D and 1,2-propylene glycol. 1,2-Propylene glycol may be used as a stabilizer for aqueous dispersions or liquors. If aqueous dispersions of compositions according to the invention are to include further components apart from A and B, these may be added before or after the dispersing step. It is possible in the case of the aforementioned separate dispersing of components A and B to add the additional components either to component A or to component B prior to their dispersing or to one of the separately prepared aqueous dispersions. It is also possible to add these additional components only after the separately prepared dispersions of A and B have been combined. In the case of the separate preparation of a dispersion each of component A and of component B, it is frequently of advantage to add additional components only after the two dispersions have been combined. If a component D is to be used, however, it can be of advantage for the separately prepared dispersion of component B to already include this component D.

In the preferred process of the conjoint dispersing of component A and component B it is of advantage for the mixture of A and B not to include any further components apart from any component D and any organic solvent before the dispersing step. In this case, the dispersant or dispersant mixture is added to the water into which is stirred the mixture which contains components A and B and any component D and organic solvent. Preferably, further components are not added until after this mixture has been dispersed.

Component C is an acrylic acid or methacrylic acid homopolymer or copolymer which contains one or more perfluorinated $R_{F1}$ and/or $R_{F2}$ radicals, where $R_{F1}$ and $R_{F2}$ are each as defined above, preferably it is a polymer which contains an acrylic or methacrylic ester as monomeric building block and in which the $R_F$ radical is present in the alcohol component of this ester. Preferably these homo- or copolymers contain building blocks derived from the monomer of the formula $$CH_2=C(R^5)-COO-R^3-R_F,$$

where $R_F$ is $R_{F1}$ or $R_{F2}$, $R^5$ is hydrogen or methyl, $R_F$ is as defined above and in claim 1 and $R^3$ is an aliphatic linear divalent radical of 2 to 4 carbon atoms. A copolymer C, in addition to the monomer constituents mentioned here, will include further monomer constituents. Preferred further, co-monomers are vinyl chloride, vinylidene chloride and fluorine-free acrylic or methacrylic esters, especially esters having 4 to 22 carbon atoms in the alcohol component. Useful $R_F$ polymers, in addition to those mentioned above, are those which, between the acrylic acid radical and the $R_F$ radical, additionally include divalent functional radicals, for example —O—, —S—, —NH— or $NR^2$. Such polymers are described for example in EP-A 190 993.

Acrylic or methacrylic acid homo- or copolymers of the kind mentioned can be prepared according to generally known methods, for example by free-radically initiated homo- or copolymerization of the corresponding monomers. $R_F$-Acrylic polymers useful as component C are described in the literature, for example in EP-A 234 724, EP-A 190 993, U.S. Pat. Nos. 3,893,984, 3,808,251 and 3,491,169.

Component D is a diisocyanate or a polyisocyanate whose NCO groups are blocked. It is known to use such blocked polyfunctional isocyanates as extenders in textile finishing. The use of these extenders in combination with fluoropolymers makes it possible to increase the level and durability of the oil and water repellent performance.

Useful diisocyanates for preparing a component D are the same diisocyanates as described above in connection with the preparation of component B. Useful polyisocyanates, ie. compounds having more than two NCO groups, are compounds which differ from the diisocyanates mentioned in that one or more C—H linkages in these diisocyanates are replaced by C—N=C=O linkages. These C—H linkages which are replaced by C—N=C=O can be aliphatic or aromatic C—H linkages.

Useful blocking agents for the —NCO groups are the same as mentioned above in connection with component B. The isocyanate groups in component D are preferably blocked by ketone oximes, eg. by butanone oxime. Blocking is preferably complete, so that component D has no analytically detectable free isocyanate groups.

Extender products useful as component D are described in European Patent Application No. 98124501.2 (date of filing: Dec. 22, 1998) and also in EP-A 196 309, EP-A 537 578 and EP-A 872 503.

The di- or polyisocyanates with blocked isocyanate groups that are useful as component D may also be polymers, especially polyurethanes having blocked isocyanate groups. Such polyurethanes are obtainable by reacting polyfunctional isocyanates with polyhydric alcohols using an excess of isocyanate groups over alcoholic OH groups and subsequently blocking the free isocyanate groups left in the polyurethane. An example of such a polyurethane is a product obtainable by blocking free isocyanate groups in DESMODUR L75 from Bayer. Another example is Bayer's Baygard EDW, a polyurethane based on an aromatic diisocyanate and 1,1,1-trimethylolpropane and whose isocyanate groups are blocked by a ketone oxime. Also useful is a polyurethane obtainable by reacting an excess of diphenylmethane 4,4'-diisocyanate with a mixture of mono-, di- and tripropylene glycol, then further reacting with 1,1,1-trimethylolpropane and N-methyldiethanolamine and blocking the free NCO groups with butanone oxime. Further useful polyurethanes are obtainable by reacting an excess of a diisocyanate or diisocyanate mixture of the abovementioned formula (XIII) with a diol or diol mixture, for example of the formula (V), (VI) or (XII), and then blocking the free isocyanate groups.

Component D may be added in pure form or in the form of an aqueous dispersion to a ready-prepared aqueous dispersion of components A and B. When the above-described process of conjointly dispersing components A and B is used, however, it is preferable to add component D to the mixture of A and B prior to dispersing. When the mixture of components A and B is present in the form of a solution in an organic solvent, it is advantageous for component D also to be used in the form of a solution in an organic solvent. It is also possible to prepare compositions according to the invention by preparing component D directly in a reaction mixture already containing component B. This can be accomplished, for example, by reacting a diisocyanate with a diol in an organic solvent to form a component B, then (to prepare component D) again adding diisocyanate and diol, using an excess of diisocyanate, and subsequently blocking the free NCO groups of the resulting polyurethane using a ketone oxime. In this process, the first diisocyanate used for preparing component B can be the same as or different to that from which component D is formed. The resulting solution of B and D in an organic solvent is then preferably combined with a component A, which may likewise be present as a solute in an organic solvent. The mixture of A, B and D can then be stirred into water which contains a nonionic dispersant and the organic solvent removed by distillation to obtain a stable aqueous dispersion of components A, B and D. Subsequently, if desired, further components of the abovementioned kind may be added.

Compositions according to the invention are preferably present in the form of aqueous dispersions which preferably include the hereinbelow mentioned components in the stated relative ratios:

5 to 50% by weight of component A, especially 5 to 25% by weight 3 to 40% by weight of component B, especially 5 to 25% by weight 0 to 30% by weight of component C, especially 3 to 20% by weight 0 to 20% by weight of component D, especially 3 to 15% by weight 0.5 to 10% by weight of dispersant or dispersant mixture 0 to 20% by weight of 1,2-propylene glycol The remainder is water and any further constituents.

Compositions according to the invention, especially in the form of aqueous dispersions, provide very good oil and water repellent effects on fiber materials, especially textile sheet materials such as wovens or knits. It is similarly possible to thereby obtain textiles which combine good LAD performance with little if any tendency to deteriorate in performance on abrasion. The oil and water repellent performance of these textiles shows little if any deterioration in use, whereas prior art textiles frequently provide poorer oil and water repellency after use or abrasion. This is believed to be explained by mechanical abrasion also removing some of the fluoropolymer from the textile surface. Textiles advantageously finishable with compositions of the invention include cover fabrics for furniture and motorized vehicle seats. Compositions according to the invention provide advantageous finishes on textiles composed of a wide variety of fiber materials, preferably textiles which are 50 to 100% synthetic polymer, especially polyester, polyacrylonitrile and/or polyamide, and 0 to 50% by weight native fiber, especially cellulose.

Aqueous dispersions of compositions according to the invention can be applied to textile sheet materials according to known methods, for example by pad-mangling. The concentration of the finishing liquor and the finishing conditions are preferably set so that, after drying, the textiles have a fluorine add-on of 0.05 to 1.5% by weight, preferably 0.1 to 0.9%, based on the total weight of the dried textile and reckoned as % by weight of F.

Application by padding is followed in a conventional manner by squeezing off and drying, for example at 100 to 120° C. for 5 to 15 minutes. It is frequently advantageous to additionally treat the dried textiles at a higher temperature, for example at 130° C. to 180° C. for 0.5 to 10 minutes.

Illustrative embodiments of the invention will now be more particularly described.

EXAMPLE 1 a) Preparation of a Component A

In a three-neck flask equipped with stirrer, thermometer and oil bath, a mixture of 0.5 mol (87 g) of dimethyl adipate and 0.5 mol (600 g) of a diol of the formula II of claim 1 (where X=—S—, c=1, b=2, h=predominantly 7 to 11) was heated to 100° C. and stirred at 100° C. until all solid fractions had disappeared. 8.5 g of a 70% aqueous solution of methanesulfonic acid were then added as transesterification catalyst. The mixture was heated to 110° C., at which point the pressure was gradually reduced. After the onset of the distillative removal of the methanol formed, the distillation was continued at 150 to 200 mbar and 110° C. for 5 hours. About 24 g of distillate were obtained. Cooling gave 660 g of a solid product (component A), which was dissolved in about 830 g of methyl isobutyl ketone for better handling.

b) Preparation of a Nonionic Aqueous Dispersion of a Component A 225 g of a 65° C. solution prepared according to Example 1a) were stirred by means of a high speed stirrer into a 65° C. mixture containing 306 g of water, 10 g of an ethoxylated (10 EO) isotridecyl alcohol and 13 g of 1,2-propylene glycol. A high pressure homogenization at 60° C. provided a dispersion, from which the methyl isobutyl ketone solvent was removed by distillation at 70° C. under reduced pressure. The resulting dispersion was diluted with water to a concentration of 20% by weight. The result was a slightly bluish milky dispersion.(emulsion) ("dispersion 1").

EXAMPLE 2 a) Preparation of a Component B 320 g (0.267 mol) of the diol of the formula II which was also used in Example 1a, 44.5 g (0.212 mol) of trimethylhexamethylene 1,6-diisocyanate (mixed isomers) and 633 g of methyl isobutyl ketone were mixed and heated to 65° C. with stirring.

After everything had gone into solution, 0.08 g of triethylamine and 0.3 g of dibutyltin dilaurate were added (both in the form of a solution in methyl isobutyl ketone). The mixture was stirred at 85° C. until NCO groups were no longer analytically detectable and then adjusted to 50° C. 105 g (0.17 mol) of DDI-1410 diisocyanate (structure see text of the description) and 13.6 g (0.23 mol) of N-methyldiethanolamine were added in succession with vigorous stirring, and stirred at 85° C. until isocyanate groups were no longer detectable.

The product obtained was diluted with methyl isobutyl ketone to an active concentration of 36.2% by weight.

To 1333 g of a polyurethane solution thus prepared were added, for the purpose of preparing a component D, 65.1 g of butanone oxime and 231 g of Desmodur L 75 (polyurethane from Bayer with free isocyanate groups). The mixture was stirred at 60° C. until free NCO groups were no longer detectable (about 20 minutes).

b) Preparation of a Nonionic Aqueous Dispersion which Includes a Component B and a Component D.

200 g of the mixture prepared according to Example 2a, which contained a component B and a component D, were added with vigorous stirring at 65° C. to a solution of 8.8 g of an ethoxylated (10 EO) isotridecanol and 11.8 g of 1,2-propylene glycol in 268 g of water. The pH of the mixture obtained was adjusted to 2.8 with hydrochloric acid, and the dispersion was subjected to a high pressure homogenization at 65° C. Removing 203 g of a solvent/water mixture at 70° C. under reduced pressure (270–350 mbar) left 269 g of a dispersion having a concentration of 32.4%, which was diluted with water to a concentration of 25.2%. This provided a slightly yellowish milky dispersion (="dispersion 2").

EXAMPLE 3

Preparation of a composition according to the invention by combining an aqueous dispersion of component A with a separately prepared aqueous dispersion of component B. 167.3 g of an aqueous dispersion prepared according to Example 1b (dispersion 1) were combined with 132.7 g of an aqueous dispersion prepared according to Example 2b (dispersion 2) to obtain 300 g of a "dispersion 3".

EXAMPLE 4

Preparation of a composition according to the invention by conjointly dispersing a component A, a component B and a component D.

The process specified in claim 11 was used to prepare an aqueous dispersion ("dispersion 4") as follows:

A solution of 57.2 g of an ester (component A) prepared according to Example 1a in 72.8 g of methyl isobutyl ketone (which solution had a temperature of about 70° C.) was thoroughly mixed with 295.5 g of a solution prepared according to Example 2a. This second solution was at about 65° C. and, in addition to 165.5 g of methyl isobutyl ketone, contained 130 g of the product mixture (which contained components B and D) formed in the course of the reaction according to Example 2a.

The thusly prepared solution of components A, B and D in methyl isobutyl ketone was added with thorough stirring to a solution of 15.3 g of 1,2-propylene glycol and 11.5 g of ethoxylated alcohol in 281 g of water. The ethoxylated alcohol was the same as in Examples 1b and 2b. The pH was then adjusted to 2.7 with hydrochloric acid and the resulting dispersion subjected to a high pressure homogenization. Distillative removal of the methyl isobutyl ketone and dilution with water to a concentration of 25.5% provided dispersion 4, a slightly yellowish milky dispersion.

EXAMPLE 5 a) Preparation of a Component A

In a three-neck flask equipped with stirrer, thermometer and oil bath, a mixture of 0.5 mol (87 g) of dimethyl adipate and 0.5 mol (510 g) of a diol of the formula (VII) of claim 1 (where $X^1$=—S—, $R^2$=H, b1=1, h2=predominantly 7 to 11) was heated to 100° C. and stirred at this temperature until all solid fractions had disappeared 8.5 g of a 70% aqueous solution of methanesulfonic acid were then added as transesterification catalyst. The mixture was heated to 110° C., at which point the pressure-was gradually reduced. After the onset of the distillative removal of the methanol formed, the distillation was continued at 150 to 200 mbar and 110° C. for 5 hours. About 24 g of distillate were obtained. Cooling gave 570 g of a solid product (component A), which was dissolved in about 830 g of methyl isobutyl ketone for better handling.

b) Preparation of a Component A

In a three-neck flask equipped with stirrer, thermometer and oil bath, a mixture of 0.5 mol (87 g) of dimethyl adipate and 0.5 mol (570 g) of a diol of the formula (VIII) of claim 1 (where $X^1$=—O—, Y=—N—$C_4H_9$) was heated to 100° C. and stirred at this temperature until all solid fractions had disappeared 50 g of a 70% aqueous solution of methanesulfonic acid were then added as transesterification catalyst. The mixture was heated to 110° C., at which point the pressure was gradually reduced. After the onset of the distillative removal of the methanol formed, the distillation was continued at 150 to 200 mbar and 110° C. for 5 hours. About 24 g of distillate were obtained. Cooling gave 630 g of a solid product (component A), which was dissolved in about 830 g of methyl isobutyl ketone for better handling.

c) Preparation of a Nonionic Aqueous Dispersion of a Component A 225 g of a 65° C. solution prepared according to Example 5a) were stirred by means of a high speed stirrer into a 65° C. mixture containing 306 g of water, 10 g of an ethoxylated (10 EO) isotridecyl alcohol and 13 g of 1,2-propylene glycol. A high pressure homogenization at 60° C. provided a dispersion, from which the methyl isobutyl ketone solvent was removed by distillation at 70° C. under reduced pressure. The resulting dispersion was diluted with water to a concentration of 20% by weight The result was a slightly bluish milky dispersion (emulsion) ("dispersion 5").

EXAMPLE 6 a) Preparation of a Component B 273 g (0.267 mol) of the diol of the formula (VII) which was also used in Example 5a, 44.5 g (0.212 mol) of trimethylhexamethylene 1,6-diisocyanate (mixed isomers) and 633 g of methyl isobutyl ketone were mixed and heated to 65° C. with stirring.

After everything had gone into solution, 0.08 g of triethylamine and 0.3 g of dibutyltin dilaurate were added (both in the form of a solution in methyl isobutyl ketone). The mixture was stirred at 85° C. until NCO groups were no longer analytically detectable and then adjusted to 50° C. 105 g (0.17 mol) of DDI-1410 diisocyanate (structure see text of the description) and 13.6 g (0.23 mol) of N-methyldiethanolamine were added in succession with vigorous stirring, and stirred at 85° C. until isocyanate groups were no longer detectable.

The product obtained was diluted with methyl isobutyl ketone to an active concentration of 35.2% by weight.

To 1333 g of a polyurethane solution thus prepared were added, for the purpose of preparing a component D, 65.1 g of butanone oxime and 231 g of Desmodur L 75 (polyurethane from Bayer with free isocyanate groups). The mixture was stirred at 60° C. until free NCO groups were no longer detectable (about 20 minutes).

b) Preparation of a Component B 305 g (0.267 mol) of the diol of the formula (VIII) which was also used in Example 5b, 44.5 g (0.212 mol) of trimethylhexamethylene 1,6-diisocyanate (mixed isomers) and 633 g of methyl isobutyl ketone were mixed and heated to 65° C. with stirring.

After everything had gone into solution, 0.08 g of triethylamine and 0.3 g of dibutyltin dilaurate were added (both in the form of a solution in methyl isobutyl ketone). The mixture was stirred at 85° C. until NCO groups were no longer analytically detectable and then adjusted to 50° C. 105 g (0.17 mol) of DDI-1410 diisocyanate (structure see text of the description) and 13.6 g (0.23 mol) of N-methyldiethanolamine were added in succession with vigorous stirring, and stirred at 85° C. until isocyanate groups were no longer detectable.

The product obtained was diluted with methyl isobutyl ketone to an active concentration of 35.7% by weight.

To 1333 g of a polyurethane solution thus prepared were added, for the purpose of preparing a component D, 65.1 g of butanone oxime and 231 g of Desmodur L 75 (polyurethane from Bayer with free isocyanate groups). The mixture was stirred at 60° C. until free NCO groups were no longer detectable (about 20 minutes).

c) Preparation of a Nonionic Aqueous Dispersion which Includes a Component B and a Component D.

200 g of the mixture prepared according to Example 6a, which contained a component B and a component D, were added with vigorous stirring at 65° C. to a solution of 8.8 g of an ethoxylated (10 EO) isotridecanol and 11.8 g of 1,2-propylene glycol in 268 g of water. The pH of the mixture obtained was adjusted to 2.8 with hydrochloric acid, and the dispersion was subjected to a high pressure homogenization at 65° C. Removing 203 g of a solvent/water mixture at 70° C. under reduced pressure (270–350 mbar) left 269 g of a dispersion having a concentration of 32.4%, which was diluted with water to a concentration of 25.2%. This provided a slightly yellowish milky dispersion (="dispersion 6").

EXAMPLE 7

Preparation of a composition according to the invention by combining an aqueous dispersion of component A with a separately prepared aqueous dispersion of component B. 167.3 g of an aqueous dispersion prepared according to Example 5c (dispersion 5) were combined with 132.7 g of an aqueous dispersion prepared according to Example 6c (dispersion 6) to obtain 300 g of a "dispersion 7".

EXAMPLE 8

Preparation of a composition according to the invention by conjointly dispersing a component A, a component B and a component D.

The process specified in claim 12 was used to prepare an aqueous dispersion ("dispersion 8") as follows:

A solution of 130 g of an ester (component A) prepared according to Example 5a in 150 g of methyl isobutyl ketone (which solution had a temperature of about 70° C.) was thoroughly mixed with 295.5 g of a solution prepared according to Example 6a. This second solution was at about 65° C. and, in addition to 165.5 g of methyl isobutyl ketone, contained 130 g of the product mixture (which contained components B and D) formed in the course of the reaction according to Example 6a.

The thusly prepared solution of components A, B and D in methyl isobutyl ketone was added with thorough stirring to a solution of 15.3 g of 1,2-propylene glycol and 11.5 g of ethoxylated alcohol in 281 g of water. The ethoxylated alcohol was the same as in Examples 5c and 6c. The pH was then adjusted to 2.7 with hydrochloric acid and the resulting dispersion subjected to a high pressure homogenization. Distillative removal of the methyl isobutyl ketone and dilution with water to a concentration of 26% provided dispersion 8, a slightly yellowish milky dispersion.

Finishing Tests

Liquors each comprising one of the dispersions 1 to 8 were used to treat textile fabrics. Dispersions 3 and 4 obtained in Examples 3 and 4 and dispersions 7 and 8 obtained in Examples 7 and 8 contained not only a component A but also a component B and thus constituted compositions according to the invention. Dispersion 1 of Example 1b and dispersion 2 of Example 2b and also dispersions 5 and 6 of respectively Examples 5c and 6c, by contrast, each contained only one of the components A and B and thus were not compositions according to the invention, but only comparatives. Dispersions 3 and 7 were prepared by the process of separately dispersing the components A and B and combining the separately prepared aqueous dispersions, while dispersions 4 and 8 were prepared by the particularly preferred process of conjoint dispersing.

The liquors used for the subsequent finishing examples 9 to 16 each contained 1 g/l of 60% acetic acid, 5 g/l of a wetting agent (the same wetting agent in all examples, comprising a mixture of ethoxylated products as well as water) and the hereinbelow indicated amounts of dispersions 1 to 8.

EXAMPLE 9
(Not According to Invention)
Finishing liquor 9 with 50 g/l of dispersion 1

EXAMPLE 10
(Not According to Invention)
Finishing liquor 10 with 75.8 g/l of dispersion 2

EXAMPLE 11
(According to Invention)
Finishing liquor 11 with 57.6 g/l of dispersion 3

EXAMPLE 12
(According to Invention)
Finishing liquor 12 with 50 g/l of dispersion 4

EXAMPLE 13
(Not According to Invention)
Finishing liquor 13 with 50 g/l of dispersion 5

EXAMPLE 14
(Not According to Invention)
Finishing liquor 14 with 75.3 g/l of dispersion 6

EXAMPLE 15
(According to Invention)
Finishing liquor 15 with 56.7 g/l of dispersion 7

EXAMPLE 16
(According to Invention)
Finishing liquor 16 with 50 g/l of dispersion 8

The differences in the amounts of dispersions 1 to 4 included in liquors 9 to 12 are the result of the liquors being made up in such a way that they all contain the same amount of fluorine (in % by weight), namely 4.55% by weight of F, in order to provide better comparability of the oil and water repellency effects on the textiles.

The differences in the amounts of dispersions 5 to 8 included in liquors 13 to 16 are the result of the liquors being made up in such a way that they all contain the same amount of fluorine (in % by weight), namely 5.5 g of F/l of liquor, in order to provide better comparability of the oil and water repellency effects on the textiles.

Each of liquors 9 to 16 was used to treat 4 different types of fabric. They were applied by pad-mangling. The wet pickup differed from fabric to fabric, whereas there were hardly any differences between the liquors. The wet pickup in % weight increase (based on untreated fabric weight) after squeezing off is reported hereinbelow for each kind of fabric.

After pad-mangling, each fabric sample was dried at 110° C. for 15 minutes and then cured at 150° C. for 5 minutes.

The four kinds of fabric were:

| | |
|---|---|
| Fabric a) | 100% cotton |
| | Wet pickup after padding and mangling: 90% |
| Fabric b) | Cotton/polyacrylonitrile/viscose 70:20:10 |
| | Wet pickup: 85% |
| Fabric c) | 100% polyacrylonitrile |
| | Wet pickup: 100% |
| Fabric d) | Polyester/wool 70:30 |
| | Wet pickup: 80% |

After the above-specified treatment, the water repellency and the oil repellency of the fabric samples were determined according to the methods specified hereinbelow. The oil repellency was determined directly on the fabric as obtained after the above-described treatment (the respective data are identified by "Original" in the table below) and also after the substrate has been abraded using 5 back and forth rubs and after it has been abraded using 10 back and forth rubs. The abraded oil repellency provides information about the durability of the oil repellency performance after use of or mechanical insults to the textile. The abrading of the finished fabric samples was carried out by means of a crockmeter as specified in AATCC Test Method 8-1996 (which corresponds to ISO 105-X 12). This crockmeter was armed with abrasive paper. Using this apparatus, the fabric samples were abraded using 5 or 10 back and forth rubs. The determination of the oil repellent properties was repeated after this abrading.

Oil repellency was determined using MTCC Test Method 118-1997 (which corresponds to ISO 14419). This test method is based on the resistance of the finished fabric to wetting by a number of liquid hydrocarbons of varying surface tensions. The oil repellent effect is given a numerical rating; the higher the number, the better the oil repellency.

The water repellency of the finished fabrics was determined by means of the spray test described in AATCC Test Method 22-1996 (which corresponds to ISO 4920). The wetting of the fabric sample by sprayed-on water is visually rated. The most effective water repellency corresponds to a rating of 100, and the least effective to a rating of 0. The hereinbelow recited table reports 3 ratings for each spray test, which correspond to the ratings of three successive spray tests (without the fabrics drying in between).

Tables 1 and 2 below show the results of the tests.

The tables reveal that Examples 11, 12, 15 and 16 according to the invention lead altogether to better results than Examples 9, 10, 13 and 14.

TABLE 1

| | Fabric a Liquor/Example | | | | Fabric b Liquor/Example | | | | Fabric c Liquor/Example | | | | Fabric d Liquor/Example | | | |
|---|---|---|---|---|---|---|---|---|---|---|---|---|---|---|---|---|
| | 9 | 10 | 11 | 12 | 9 | 10 | 11 | 12 | 9 | 10 | 11 | 12 | 9 | 10 | 11 | 12 |
| Oil repellency | | | | | | | | | | | | | | | | |
| Original | 6 | 6 | 6 | 6 | 6 | 6 | 6 | 6 | 4 | 4 | 5 | 5 | 0 | 3 | 3 | 4 |
| After 5 back & forth rubs | 5 | 3–4 | 6 | 6 | 5 | 4 | 6 | 6 | 3–4 | 4 | 5 | 5 | 0 | 3 | 3 | 3–4 |
| After 10 back & forth rubs | 5 | 3–4 | 5 | 5–6 | 5 | 4 | 5 | 5–6 | 4 | 3 | 5 | 5 | 0 | 2–3 | 3 | 3–4 |
| Water repellency | 70 | 80 | 80 | 80 | 50 | 100 | 100 | 100 | 50 | 100 | 90 | 100 | 50 | 90 | 80 | 90 |
| | 50 | 80 | 80 | 80 | 50 | 100 | 100 | 100 | 50 | 100 | 80 | 90 | 50 | 80 | 80 | 80 |
| Spray test | 50 | 80 | 70 | 70 | 50 | 100 | 90 | 100–90 | 50 | 90 | 80 | 90 | 50–0 | 80 | 70 | 80 |

TABLE 2

| | Fabric a Liquor/Example | | | | Fabric b Liquor/Example | | | | Fabric c Liquor/Example | | | | Fabric d Liquor/Example | | | |
|---|---|---|---|---|---|---|---|---|---|---|---|---|---|---|---|---|
| | 13 | 14 | 15 | 16 | 13 | 14 | 15 | 16 | 13 | 14 | 15 | 16 | 13 | 14 | 15 | 16 |
| Oil repellency | | | | | | | | | | | | | | | | |
| Original | 6 | 6 | 6 | 6 | 6 | 6 | 6 | 6 | 4 | 4 | 5 | 5 | 0 | 3 | 3 | 4 |
| After 5 back & forth rubs | 5 | 3–4 | 6 | 6 | 5 | 4 | 6 | 5–6 | 3–4 | 4 | 5 | 5 | 0 | 3 | 3 | 4 |
| After 10 back & forth rubs | 5 | 3 | 5 | 5–6 | 5 | 4 | 5 | 5–6 | 3 | 3 | 5 | 5 | 0 | 2 | 3 | 3–4 |
| Water repellency | 70 | 80 | 80 | 80 | 50 | 100 | 100 | 100 | 50 | 100 | 100 | 100 | 50 | 90 | 80 | 90 |
| | 50 | 70 | 80 | 70 | 50 | 100 | 100 | 100–90 | 50 | 90 | 90 | 90 | 50 | 80 | 80 | 80 |
| Spray test | 50 | 70 | 70 | 70 | 50 | 90 | 90 | 100–90 | 50 | 90 | 80 | 90 | 50–0 | 70 | 70 | 70 |

What is claimed is:

1. A composition comprising a component A and a component B, component A being an ester or a mixture of esters and being obtainable by reacting a dicarboxylic acid or a mixture of dicarboxylic acids of the formula (I)

$$\text{HOOC(CH R)}_a\text{COOH} \tag{I}$$

with a diol or a mixture of diols selected from diols of the formulae (II) to (XI)

  (II)

$$\text{HO—CH}_2\text{—CRR'—(X)}_a\text{CRR'—CH}_2\text{OH} \tag{III}$$

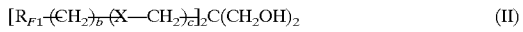  (IV)

$$\text{HO—CH}_2\text{CH}_2\text{—N R''—CH}_2\text{CH}_2\text{OH} \tag{V}$$

  (VI)

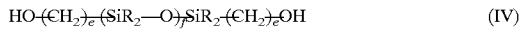  (VII)

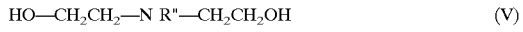  (VIII)

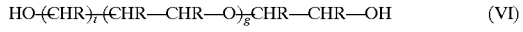  (IX)

  (X)

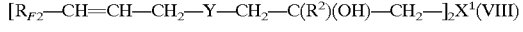  (XI)

subject to the proviso that at least one diol of the formula (II) or of the formula (III) or of one of the formulae (VII) to (XI) participates in the reaction, and component B being an oligourethane or polyurethane obtainable by reacting a diol or a mixture of diols selected from diols of the formulae (II) to (XII)

$$(\text{HO—CH}_2)_3\text{C—CH}_2\text{—CH}_3 \tag{XII}$$

with a diisocyanate or a mixture of diisocyanates of the formula (XIII)

$$\text{OCN—R'''—NCO} \tag{XIII}$$

where any R is independently of the others hydrogen or an alkyl radical of 1 to 4 carbon atoms, a is from 2 to 10, b is from 1 to 4, c is 0 or 1, d is 0 or 1, $R_{F1}$ is $CF_3\text{—(CF}_2\text{)}_{h1}$, h1 is from 3 to 15, R' is $\text{—(CH}_2\text{)}_b\ R_{F1}$ when d is 1 and $\text{—X—(CH}_2\text{)}_b\ R_{F1}$ when d is 0, e is from 1 to 4, f is from 10 to 50, g is from 0 to 6, t is from 0 to 8, X is —O—, —S—, —NR— or —PR—, R'' is R or —CH$_2$CH$_2$OH, $X^1$ is —O—, —S—, —NR$^2$—, —PR$^2$—, —S—(CH$_2$)$_{h1}$S—, —(S)$_u$—, —S(O$_2$)— or —S(O$_2$)—(CH$_2$)$_{h1}$—S(O$_2$)—, Y is —O—, —S—, —NR$^2$— or —PR$^2$—, Z is $\text{-(CH}_2\text{-)}_{\overline{c1}}\text{-(OC}_p\text{H}_{2p}\text{-)OCHR—CHR-)}_{\overline{d1}}\text{OH}$, b1 is from 1 to 4, c1 is from 0 to 18, d1 is from 0 to 8, $R_{F2}$ is $CF_3\text{-(CF}_2\text{-)}_{\overline{h2}}$, h2 is from 3 to 19, e1 is from 0 to 8, any $R^2$ is independently of the others hydrogen or a branched or unbranched alkyl radical of 1 to 18 carbon atoms, p is from 3 to 8, u is from 2 to 8, R''' is a divalent aliphatic or cycloaliphatic radical of 4 to 40 carbon atoms or is a divalent aromatic radical of the formula —C$_6$H$_3$(R)— or —C$_6$H$_3$(R)—CH$_2$—C$_6$H$_3$(R)— or —C$_6$H$_3$(R)—CR$_2$—C$_6$H$_3$(R)—, where C$_6$H$_3$ is a trivalent radical derived from benzene, and if desired blocking any isocyanate groups left in the reaction product of diol and diisocyanate.

2. A composition according to claim 1, wherein component A is obtainable by reacting dicarboxylic acid or dicarboxylic acid mixture with diol or diol mixture in such a ratio that a total of 0.9 to 1.1 mol of alcoholic OH groups are used per mole of —COOH groups and 50 to 100% of the number of these OH groups come from a diol of the formula (II) and/or of the formula (III) and/or of the formula (VII), (VIII), (IX), (X) or (XI).

3. A composition according to claim 1, wherein component B is obtainable by reacting diol or diol mixture with diisocyanate or diisocyanate mixture in such a ratio that 0.9 to 1.1 mol of —NCO groups are used per mole of alcoholic OH group and that any isocyanate groups still present after the reaction are blocked with a ketone oxime.

4. A composition according to claim 1, being an aqueous dispersion which, as well as components A and B, additionally includes a dispersant or a mixture of dispersants.

5. A composition according to claim 1, additionally including one or more of components C, D and 1,2-propylene glycol, component C being an acrylic acid or methacrylic acid homopolymer or copolymer which contains one or more $R_{F1}$ or $R_{F2}$ radicals, where $R_{F1}$ and $R_{F2}$ are each as defined in claim 1, and component D being a diisocyanate or polyisocyanate whose —NCO groups are blocked.

6. A composition according to claim 1, wherein the weight ratio of component A to component B is in the range from 1:1 to 5:1 when component A was prepared using a diol or diol mixture of the formulae (II) to (VI) and this weight ratio is in the range from 1:10 to 5:1 when component A was prepared using a diol or diol mixture of the formulae (VII) to (XI).

7. A composition according to claim 4, comprising 5 to 50% by weight of component A, 3 to 40% by weight of component B, 0 to 30% by weight of component C, 0 to 20% by weight of component D, 0.5 to 10% by weight of dispersant or dispersant mixture 0 to 20% by weight of 1,2-propylene glycol.

8. A composition according to claim 1, wherein component A is an ester obtainable by reacting adipic acid with a diol mixture of the formula (II) where b=2, c=1, X=—S— and $R_{F1}$=CF$_3$-(CF$_2$-)$_{\overline{h1}}$, where h1 is from 7 to 11 for the individual diols of the mixture.

9. A composition according to claim 1, wherein component A is an ester obtainable by reacting adipic acid with a diol of the formula (VII) or of the formula (VIII) or with a mixture of diols selected from compounds of the formula (VII) and of the formula (VIII) and where $X^1$ is —S— or —NR$^2$—, b$^1$ is 1 and Y is —O—, $R_{F2}$=CF$_3$-(CF$_2$-)$_{\overline{h2}}$, where h2 is from 7 to 11 for the individual diols of the mixture.

10. A composition according to claim 1, wherein component B is an oligourethane or polyurethane obtainable by reacting a diol of the formula (II), of the formula (VII) or of the formula (VIII) with a diisocyanate of the formula OCN—R'''—NCO, where R''' is a linear or branched alkylene radical of 6–12 carbon atoms in such amounts that the resulting reaction product has no free —NCO groups but free OH groups, then further reacting with a cycloaliphatic diisocyanate of 10 to 40 carbon atoms in such amounts that the resulting reaction product has free NCO groups, and then reacting with a diol of the formula (V) in such amounts that the resulting reaction product (component B) has no free NCO groups.

11. A composition according to claim 4, including a nonionic dispersant comprising an ethoxylated alcohol or a mixture of ethoxylated alcohols of the formula, $R^1$—O—(CH$_2$CH$_2$O-)$_n$H where $R^1$ is a linear or branched alkyl radical of 6 to 22 carbon atoms and n is from 4 to 40.

12. A process for preparing a composition according to claim 4, which comprises preparing a mixture of the components A and B which optionally additionally includes an organic solvent and/or a component D, dispersing this mixture in water using a nonionic dispersant or dispersant mixture without using an anionic or cationic dispersant and then optionally removing the organic solvent and optionally adding further components.

13. A process according to claim 12, wherein the mixture includes components A and B in such amounts that the A:B weight ratio is in the range from 1:10 to 5:1.

14. A process as claimed in claim 12, wherein the mixture is dispersed in such an amount that the composition includes 10 to 50% by weight of the sum total of components A and B, based on the total weight of the composition without organic solvent.

15. A process according to claim 12, wherein the nonionic dispersant used is an ethoxylated alcohol of the formula $R^1$—O-(CH$_2$CH$_2$O-)$_n$H or a mixture of such alcohols, where $R^1$ and n are each as defined in claim 11.

16. A composition obtainable by a process according to claim 12.

17. A method for treating fiber materials, which comprises applying a composition according to claim 1 or claim 16 to the fiber materials.

18. A method according to claim 17, wherein the fiber materials are textile sheet materials which are 50 to 100% by weight synthetic polymer and 0 to 50% by weight native fiber.

\* \* \* \* \*